(12) United States Patent
Popeil et al.

(10) Patent No.: US 6,965,095 B1
(45) Date of Patent: Nov. 15, 2005

(54) ROTISSERIE OVEN HAVING HORIZONTALLY AND VERTICALLY ORIENTED COOKING ELEMENTS

(75) Inventors: Ronald M. Popeil, Beverly Hills, CA (US); Alan L. Backus, Los Angeles, CA (US); Lauren Popeil, Los Angeles, CA (US)

(73) Assignee: Ronco Inventions, LLC, Los Angeles, CA (US)

( * ) Notice: Subject to any disclaimer, the term of this patent is extended or adjusted under 35 U.S.C. 154(b) by 0 days.

(21) Appl. No.: 10/945,232

(22) Filed: Sep. 20, 2004

(51) Int. Cl.$^7$ ........................... F27D 11/02; A21B 1/22; A21B 1/44; A21B 2/00

(52) U.S. Cl. ....................... 219/403; 219/411; 219/412; 99/332; 99/335; 99/421 H; 99/446

(58) Field of Search ................................ 219/403, 391, 219/388, 411, 412; 99/332, 335, 421 H, 443 R, 99/446

(56) References Cited

U.S. PATENT DOCUMENTS

| 1,282,195 | A | * | 10/1918 | Crary | ........................ 219/403 |
| 2,664,490 | A | * | 12/1953 | Allgeyer | .................. 219/450.1 |
| 5,801,357 | A | * | 9/1998 | Danen | ........................ 219/403 |

* cited by examiner

Primary Examiner—Joseph Pelham
(74) Attorney, Agent, or Firm—Tucker Ellis & West LLP

(57) ABSTRACT

Indoor use rotisserie ovens which have construction features and scale which make the cleaning process easier. Shown are indoor use rotisserie ovens which also may rotate cooking foods about either a horizontal or vertical axis, which makes their applications more versatile. Construction features include: a scale appropriate for cleaning in a typical kitchen sink, use of removable electrical components, and single oven wall construction, all to allow easy cabinet cleaning. Also shown is a locking tab manufacturing detail which creates an inexpensive, light weight, oven cavity, which is easy to clean and also permits oven cavity washing and/or immersion in water. This manufacturing detail also is easy to handle by the end-user without projecting sharp edges. Self lubricated spit assembly axles are shown as well to help deaden sound.

7 Claims, 9 Drawing Sheets

ROTISSERIE OVEN HAVING HORIZONTALLY AND VERTICALLY ORIENTED COOKING ELEMENTS

BACKGROUND OF THE INVENTION

The present invention is directed toward food cooking ovens. More particularly, the present invention is directed to rotisserie ovens having horizontally and vertically oriented cooking elements.

Indoor household use rotisserie ovens are in wide use in the United States. Because most use hot electrical elements to radiantly cook foods such as meats, fish, foul, and vegetables; they commonly share cleaning problems associated with splattering, vaporizing, and recondensing of greases and oils. Cleaning typically is made yet more difficult by the presence of hard-to-reach areas such as nooks and crannies around heating elements. Further, grease may condense between inner and outer oven walls and in other inaccessible areas, potentially creating unpleasant odors and breeding grounds for bacteria.

Part of the problem is that most of these devices have twin, inner and outer, oven wall construction. Such construction does not allow these devices to be immersed in water for cleaning because water would collect in the spaces between the inner and outer walls. Immersion in water for cleaning is also prevented by the presence of integrally connected electrical components.

Many outdoor rotisseries have single thickness walls encasing their oven cavities. A particularly innovative embodiment of this outdoor construction uses a single thickness oven wall construction and removable electrical components. Such device relies on an outer frame to support the oven cavity and its electrical components. Consequently this device is more expensive to construct than a device which does not rely on an outer frame. In addition, the scale of this device appears to make it difficult to wash the oven cavity in a kitchen sink.

Other problems indoor household use rotisseries have include lack of versatility. As an example, horizontal spit countertop rotisseries, are good for cooking chickens, but are inappropriate for cooking pizzas. By contrast, horizontal turntable rotisseries, may cook pizzas, but are inappropriate for chickens. And none of these devices can cook breads.

It would be desirable to have a single device which could cook a variety of foods and overcomes the aforementioned problems.

SUMMARY OF THE INVENTION

In accordance with the present invention, there is provided a cooking system which is able to cook a variety of foods.

In accordance with the present invention, there is provided an indoor use oven which has construction features and scale which make the cleaning process easier. Further, in accordance with the present invention, there is provided a cooking system which is able to rotate cooking foods about either a horizontal or vertical axis, which makes its application more versatile. The cooking system also provides apparatus for cooking breads and bread sticks. The cooking system of the present invention includes a scale appropriate for cleaning in a typical kitchen sink, use of removable electrical components and single oven wall construction, both to allow cabinet washing and/or immersion for cleaning, and a locking tab manufacturing detail which creates an inexpensive, light weight, oven cavity, which is easy to clean and also permits oven cavity washing and/or immersion in water.

Still further, in accordance with the present invention, there is provided cooking system. The cooking system comprises housing means defining an interior chamber, the housing means including an opening adapted to receive a food product into the interior chamber. The housing means further defines a port adapted to matingly receive a removable heating element therethrough. The cooking system also comprises door means adapted to selectively seal the opening and a control box. The control box includes a control box housing and an elongated, electrical resistance heating element secured to the control box housing so as to extend outwardly from an exterior therof. The control box also includes means adapted to selectively secure the control box housing to an exterior of the housing means such that the heating element is received through the port so as to extend into the interior chamber relatively proximate to a selected interior portion of the housing means and a motor. The control box further includes a mechanical coupling operatively engaged to the motor, which mechanical coupling is positioned so as to be adapted to provide a mechanical link therewith to an associated object disposed in the interior chamber and means adapted to selectively receive electrical energy into the at least one of the heating element and the motor.

In a preferred embodiment, the cooking system further comprises means adapted for securing, within the interior chamber, at least one rotatable member to the mechanical coupling so as to be linked therewith such that mechanical energy from the motor is transferred to the rotatable member through the mechanical coupling. In more preferred embodiment, the rotatable member is at least one of a rotisserie and a turntable for moving food associated therewith relative to the electrical resistance element when disposed in the interior chamber.

Preferably, the housing includes means adapted for receiving a drip pan therein, which drip pan is oriented so as to receive drippings from food disposed in the interior chamber while being heated by the heating element. In addition, the control box includes a settable timer adapted for selectively activating at least one of the rotatable member and the heating element for a selected duration.

In a preferred embodiment, the control box includes a settable timer adapted for selectively activating at least one of the rotatable member and the heating element for a selected duration. In addition, the control box includes a lighting element adapted to project light into the interior chamber when the control box is secured to the exterior of the housing.

Still other objects and aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

Figure 1:
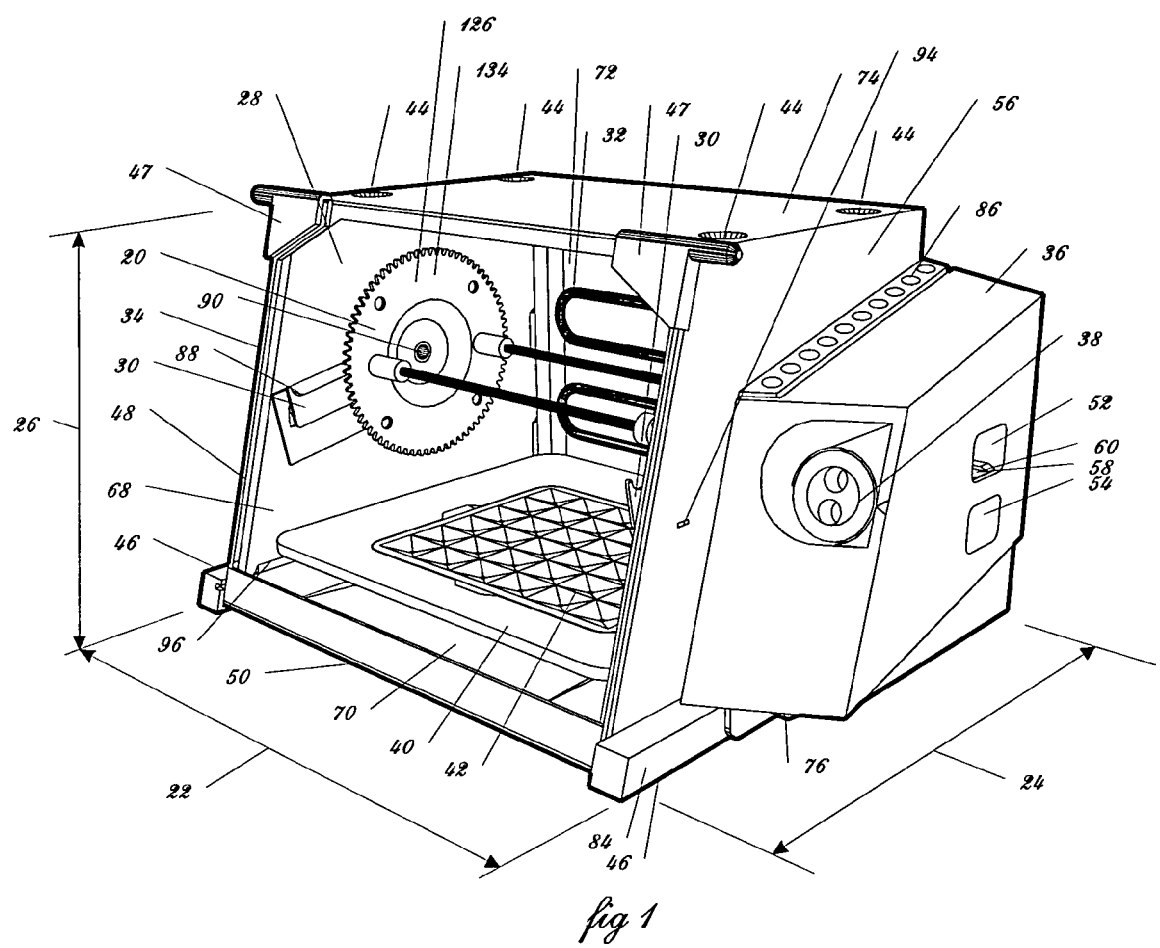
FIG. 1 is a forward, upper, right hand perspective view of a preferred embodiment of the present inventions.

The present invention is directed to rotisserie ovens having horizontally and vertically oriented cooking elements. Referring to FIG. 1, a preferred embodiment of the present invention is shown. The cooking system of the present invention is a metal enclosure 10 including an essentially horizontal metal floor 70 and metal roof 74, a generally vertical metal back 72, and two essentially vertical side walls, left oven wall 68 and right oven wall 56, and a glass door 34.

Spit assembly 20 is suspended within oven cavity 28 by spit supports 30. Heating element 32 provides the heat to cook foods within oven cavity 28. Spit supports 30 have forward rest positions 88 which provide the user an easy place to set down spit assembly 20 before sliding it into cooking position 90. Spit supports 30 as well as heater support 66 are attached to oven cavity 28 walls by means of tabs 92 on the supports sliding into slots 94 located on the walls.

Drip pan 40 is covered by drip pan cover 42, and in combination they function to catch grease and oils dripped from cooking foods. Drip pan cover 42 also functions to prevent fires which might occur by limiting the amount of oxygen that can reach fats and oils contained within drip pan 40.

In operation, door 34 is lowered and slid beneath the unit as shown in FIGS. 6 to 9 described in detail below. The door is also suitably removed.

Control box 36 contains countdown timer 38 which turns off operation of the unit by any suitable means at a time preset by the user.

Feet rests 44 help stabilize a warming and heating tray (not shown) which is suitably rested on top of the unit.

Rails 46 provide support for the embodiment on a countertop as well as provide tracks to slide door 34 beneath oven cavity 28. Rails 46, by spacing oven cavity 28 off of a countertop, help prevent excessive heat from reaching such a countertop.

Door handles 47 provide a cool, easy to grasp handle for raising and lowering door 34. The door handles also provide protection against breakage for glass panel 48 which comprises most of door 34. The door handles are suitably comprised of PBS or other high temperature plastic. Glass panels, including tempered glass panels, are most vulnerable to breakage when impacted on their corners or edges. Door handles 46 by protruding beyond the corners, the forward and back surfaces, and the edges of glass panel 48 help protect against impact to corners and edges which might otherwise break glass panel 48. Likewise, pivot pin 50 runs along the bottom of glass panel 48 and protrudes beyond both its lower corners, to provide similar protections as door handles 47.

To facilitate both cleaning and use, dimension 22 is between 10½ inches and 16 inches. For similar reasons dimension 24 is between 9 inches and 14 inches, and dimension 26 is between 8½ inches and 14 inches. Such dimensions allow the embodiment to be cleaned in or around a kitchen sink, while still providing adequate interior space for cooking on a horizontal spit such popular foods such as: turkeys, chickens, roast beef, leg of lamb, and other common foods. It also allows a vertical axis turntable within the oven cavity which is sufficiently large to cook such foods as: pizzas, cookies, hors d'oeuvres, and other popular food items.

Figure 2:
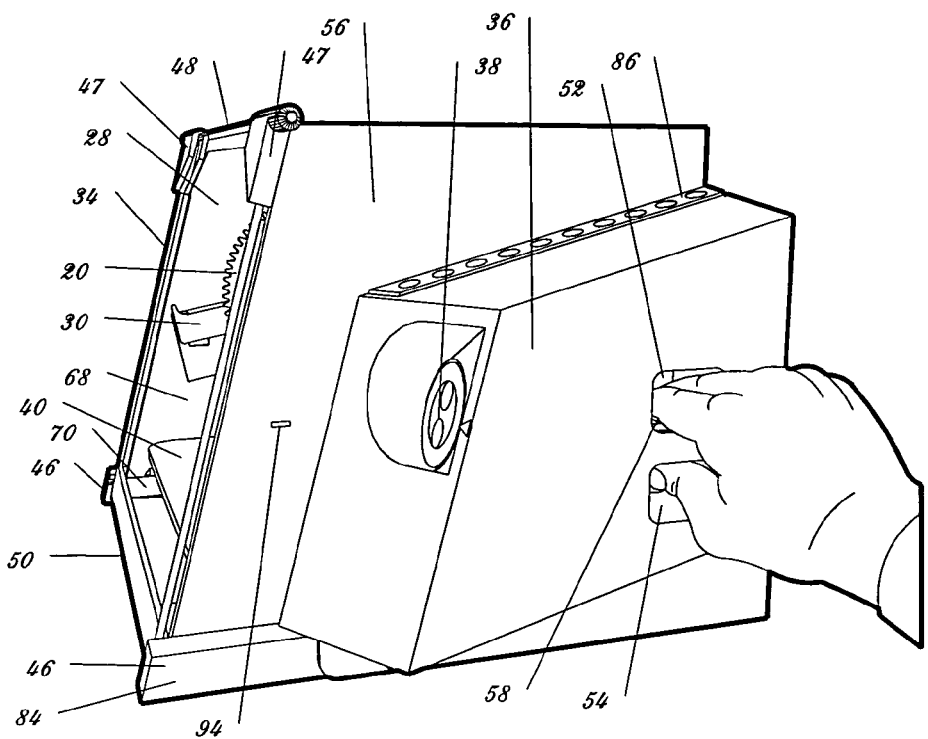
FIG. 2 is a right side perspective view of the preferred embodiment shown in FIG. 1 with a hand positioned to remove control box from oven cavity.
Figure 3:
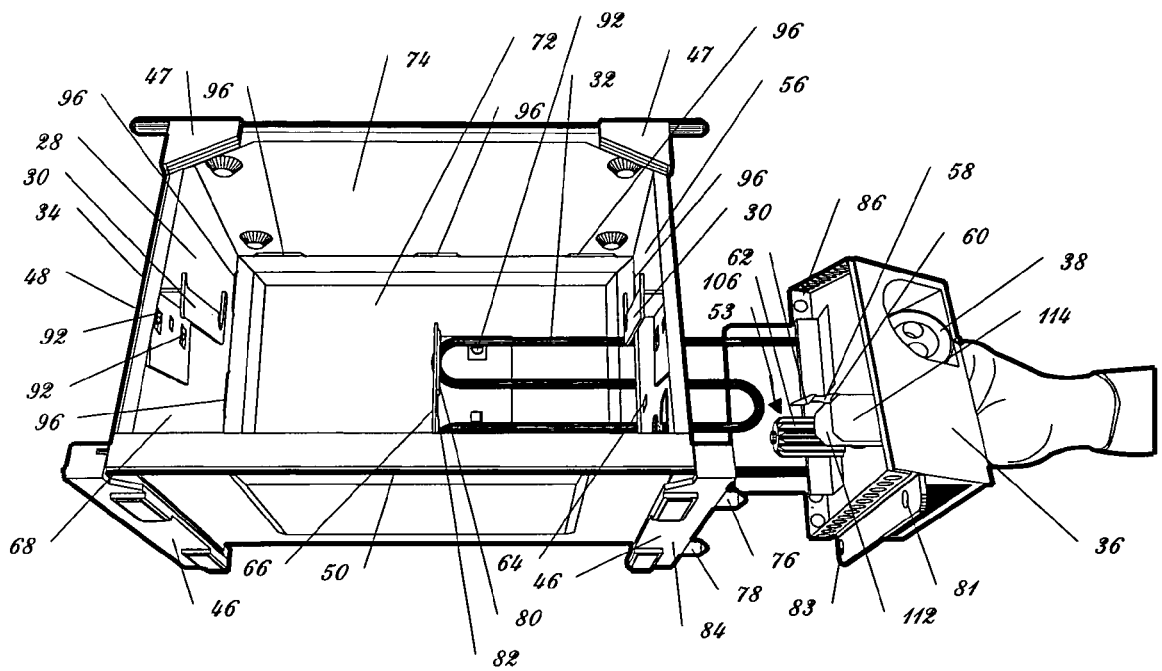
FIG. 3 is a forward, lower perspective view of the preferred embodiment shown in FIG. 1, with control box being removed.

As shown in FIGS. 2 and 3, control box 36 is rigidly connected to heating element 32, and both may be pulled away from oven cavity 28 by gripping control box 36 in recesses 52 and 54, and simultaneously squeezing latch 58 to uncouple control box 36 from right oven wall 56.

Latch 58 is partially contained within upper recess 52, and includes leaf spring 60 which may be pressed toward lower recess 54 by finger pressure. Such pressing moves cantilevered tip 62 of leaf spring 60 downward (arrow 53) within tapered hole 64 located on right oven wall 56, and thus uncouples latch 58 from right oven wall 56. This permits control box 36 and rigidly attached heating element 32 to be pulled away from right oven wall 56 as shown in FIG. 3.

Heater support 66 provides support to heater element 32 and rigidly attached control box 36 when they are attached to right oven wall 56. Heater support 66 also helps prevent warpage and distortion of heater element 32 when it is cooking. Both of these benefits are partially due to the free sliding movement of heater 32 within both upper hole 80 and lower hole 82 of heater support 66 which helps to compensate for expansion and contraction of heater 32 when it is heated and cooled in use.

Heater support 66 also helps direct the movement of heater element 32 and rigidly attached control box 36 when they are being attached to, or removed from, right oven wall 56, as shown in FIG. 3. This makes it much easier to install and remove control box 36 from right oven wall 56.

Also helping in this; forward pin 76 and rear pin 78, both of which protrude from right rail 84, project into forward hole 81 and rear hole 83 respectively, both holes located on the bottom of control box 36. This pin-in-hole disposition also helps to support control box 36 when it installed on oven cavity 28.

Ventilated heat resistant support 86 which is integrally attached to control box 36, helps reduce the amount of heat reaching the interior of control box 36.

Light 112 is part of control box 36 and is protected from breakage and from producing glare outside of oven cavity 28 by guard 114. Light 112 illuminates food being cooked within oven cavity 28.

Left oven wall 68, right oven wall 56, roof 74, floor 70, and back wall 72 may be of a single or multiple ply, and may be constructed of any appropriate material. As examples, they may be constructed from steel or aluminum or other metal or other materials such as high temperature plastics; any of which may or may not be coated with such materials as: electroplated metal, nonstick coating, paints or other finishes. They may also be fabricated using any appropriate method. As examples, they may be: stamped, drawn, molded, pressure formed, or otherwise constructed. Alternative construction techniques to those taught herein are well-known in the art and thus are not described in this document.

As a more specific example, perimeter walls 68 56 74 70 and 72 may be constructed from single ply 0.022 inch thick mild steel with a nonstick coated interior and a high temperature paint coated exterior. The outer shell for control box 36 might be molded from 0.120 inch mean wall thickness polypropylene plastic, with ventilated heat resistant support 86 constructed from stamped and drawn 0.022 inch galvanized steel painted on its exterior with heat resistant paint.

Figure 4:
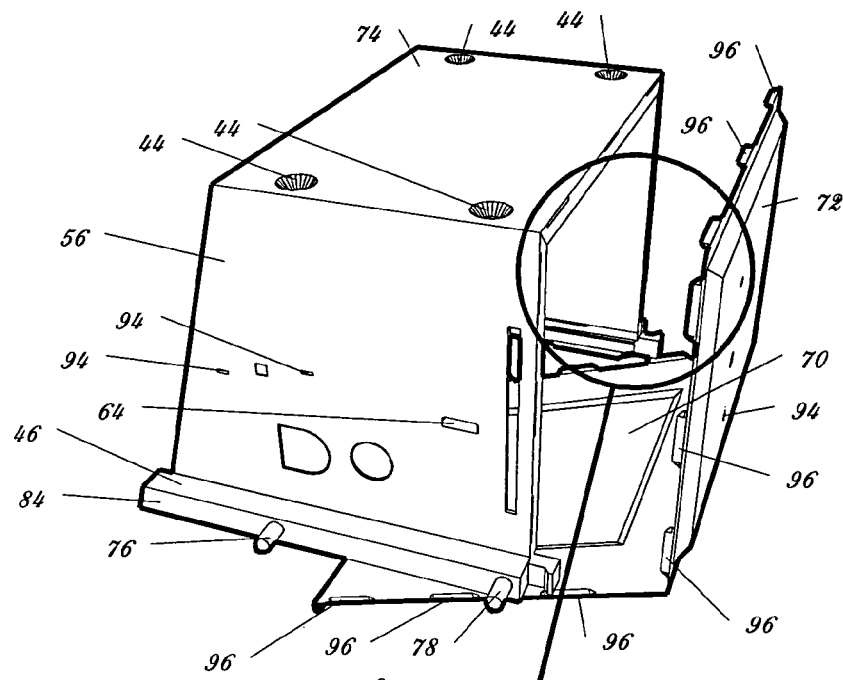
FIG. 4 is a right side perspective view of the preferred embodiment shown in FIG. 1 with back wall and floor removed to show construction details.
Figure 5:
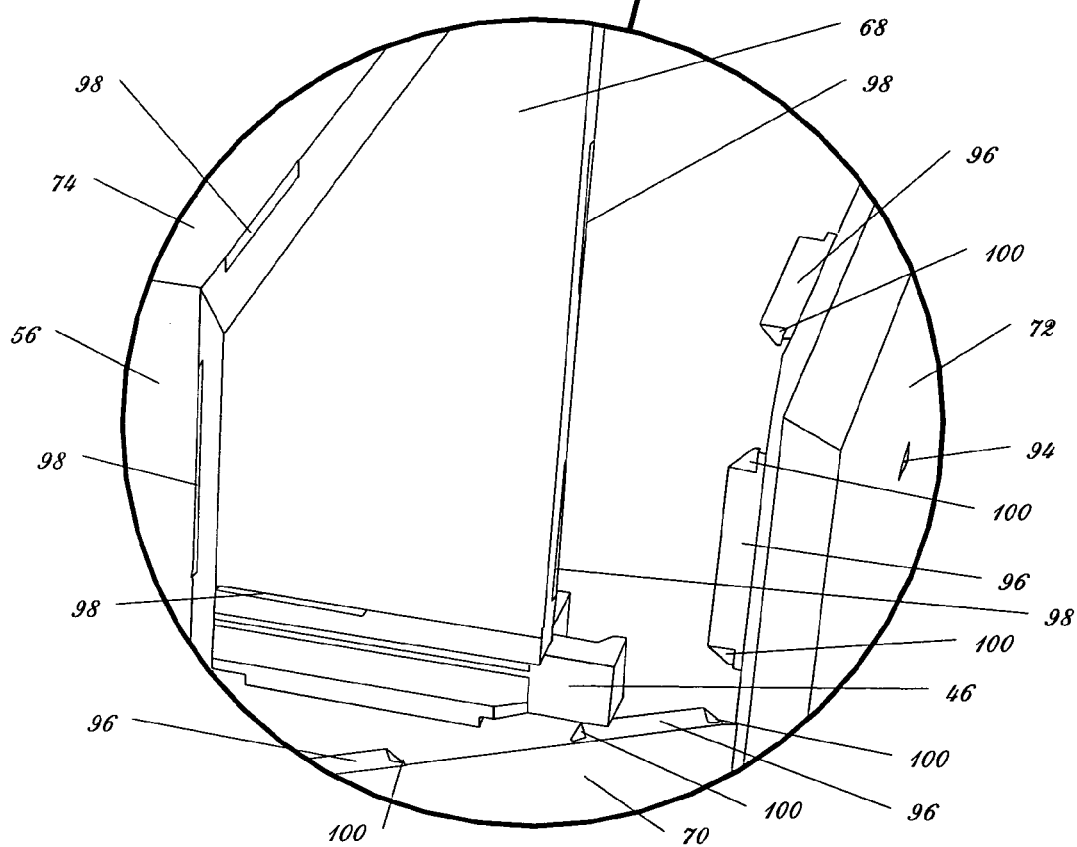
FIG. 5 is an enlargement of FIG. 4 as indicated in FIG. 4.

Perimeter walls 68 56 74 70 and 72 might be attached together as shown in FIGS. 4 and 5. As illustrated, tabs 96 slide into and become aligned within slots 98. Further, tabs 96 have resilient members 100 which lock tabs 96 within slots 98 merely by pushing tabs 96 into slots 98. This has advantages of being: simple, extraordinarily strong, inexpensive, accurate, and consistently repeatable in manufacture, when compared against other manufacturing methods such as welding, screwing, riveting, or drawing. It also has the advantage of producing a relatively smooth and even finish detail which may be easy to clean and which may have no or few projecting sharp edges or points.

Figure 6:
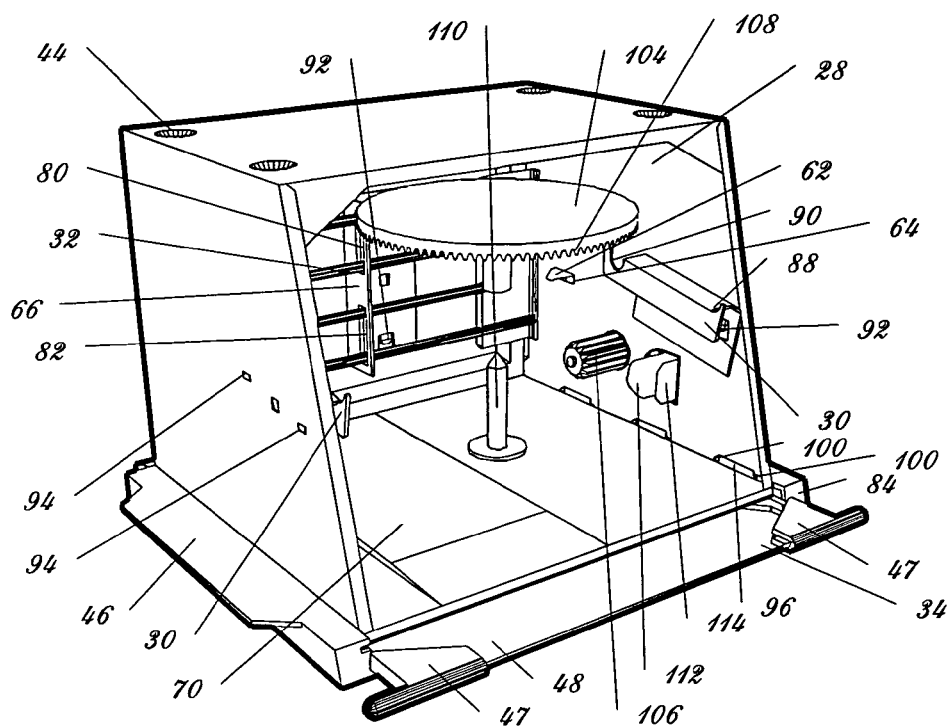
FIG. 6 is a left, upper perspective view of the preferred embodiment shown in FIG. 1 with its door slid under the oven cavity and vertical axis turntable being installed.
Figure 7:
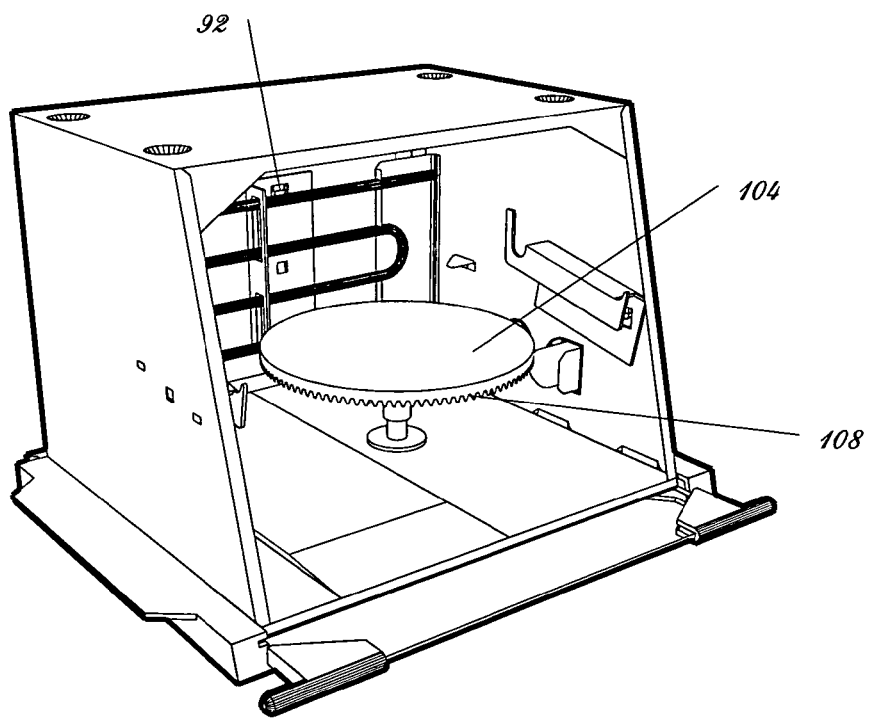
FIG. 7 is the same view as shown in FIG. 6 with turntable fully installed.
Figure 8:
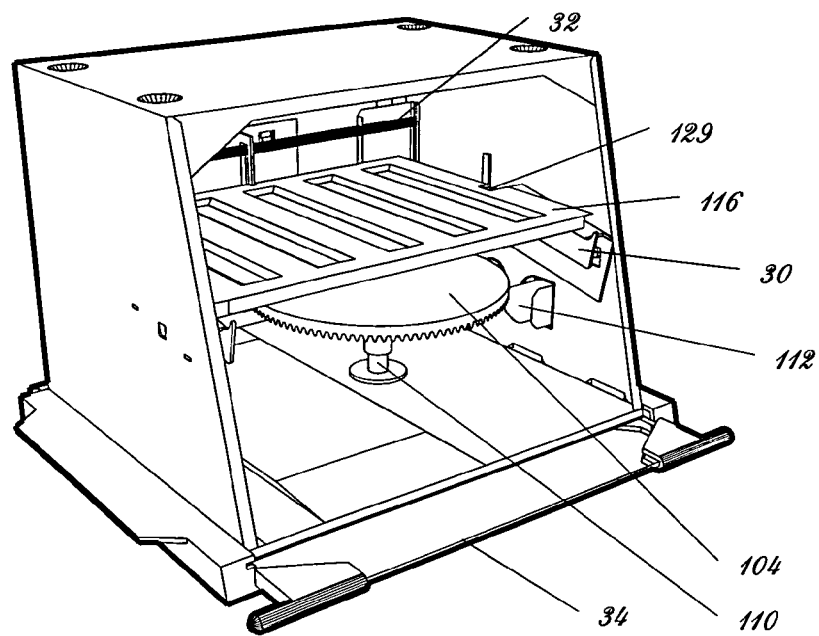
FIG. 8 is the same view as shown in FIG. 6 but with reflector installed.
Figure 9:
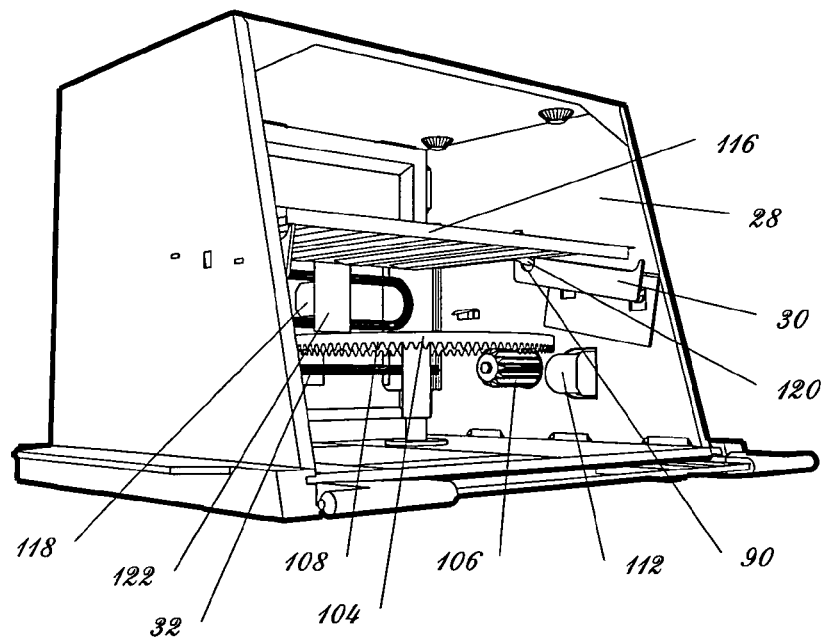
FIG. 9 is the same embodiment shown in FIG. 8 but taken from a lower viewpoint.

FIGS. 6 and 7 illustrate the installation of vertical axis turntable 104 within oven cavity 28. Drive gear 106 engages perimeter gear 108 of turntable 104 to provide rotary motion to turntable 104 whenever drive gear 106 is rotating. Thus, instead of drive gear 106 engaging gear teeth on spit assembly 20 to provide horizontal axis rotisserie cooking, drive gear 106 engages perimeter gear teeth 108 on turntable 104 to provide vertical axis rotisserie cooking. Such versatility allows for both vertical and horizontal axis rotisserie cooking with attended advantages already stated.

FIGS. 6 shows removable stationery axil pin 110 installed in oven cavity 28 with turntable 104 being lowered onto stationery axil pin 110. FIG. 7 shows turntable 104 after it has been fully installed.

As an alternative, turntable 104 could be powered by its own dedicated motor which could either be installed in the cabinet, as an example below the floor; or under turntable 104. If such a motor were electrically powered, a low or high voltage electrical cord could go out around the door in the front, or go through the floor, or plug into the cabinet.

To help in cooking, reflector 116 may be introduced into oven cavity 28. Reflector 116 rests on spit supports 30 and engages heating element 32 using tabs 118. Tabs 120 engage cooking position 90 to limit fore an aft movement of reflector 116. Reflector 116 helps even out the heat distributed radiated onto turntable 104. Blocking/support member 122 which is attached to reflector 116 also helps make the heat directed onto turntable 104 even by blocking radiant heat emanating from heating element 32 which otherwise might burn food on the perimeter of turntable 104. Blocking/support member 122 also connects and provides structure between reflector 116 and tabs 118.

Figure 10:
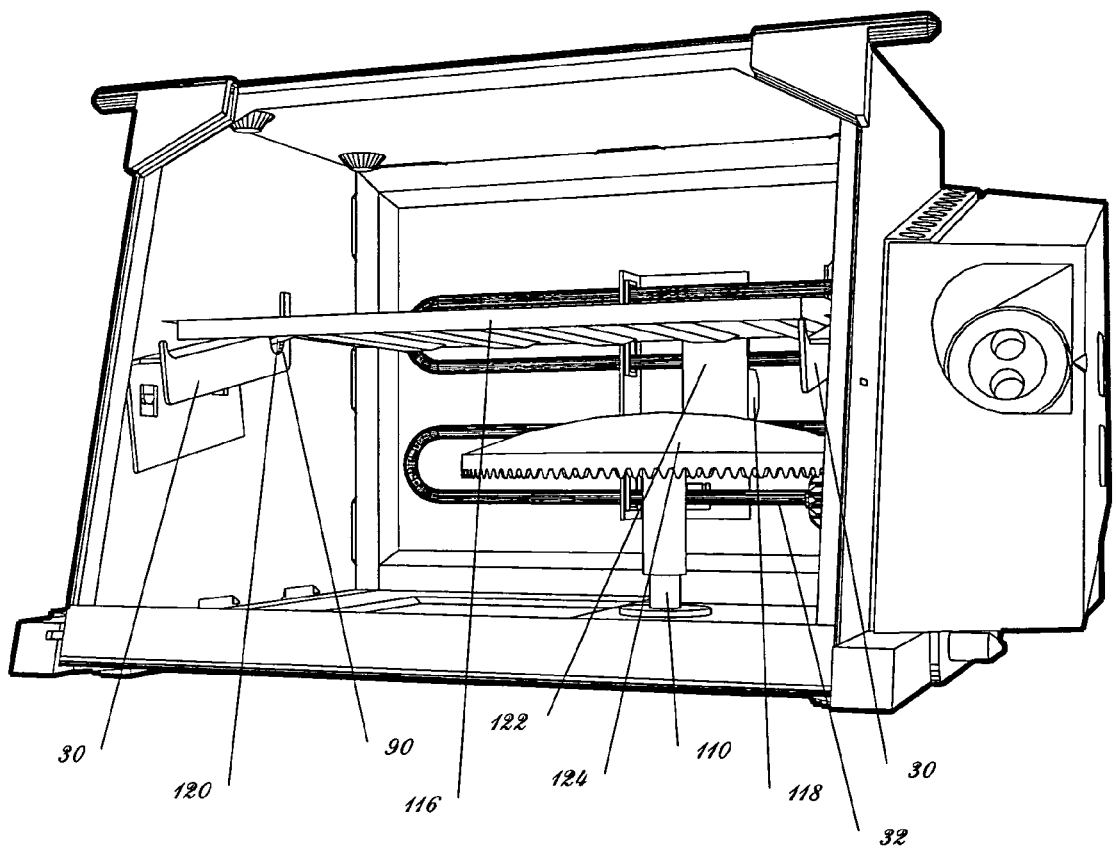
FIG. 10 is a perspective view of the same embodiment shown in FIGS. 6 to 9 but with different turntable.

As already mentioned, several different foods may be cooked on turntable 104. As examples, and not by way of any limitation, pizzas, cookies, cake layers, and hors d'oeuvres may all be cooked as well as many others known to those in the art. As further examples, and not by way of any limitation, American pancakes and flapjacks can be cooked. Also, French crepes may be cooked on turntable 104. The crepes may be cooked directly on the flat upper surface of turntable 104 in a manner similar to making American pancakes, or, as shown in FIG. 10, dome shaped turntable 124 may be used to cook the crapes, perhaps in the traditional French manner as known to those of the art.

Dome shaped turntable 124 may also be used for cooking meats and vegetables. Here, thinly sliced pieces of food may be placed on top of turntable 124 with a result that during cooking, greases and oils are shed from the food over the dome shaped cooking surface. To help in this, a torus shaped drip tray may be inserted around pin 110. Projections from the upper surface of turntable 124, including, but not limited to, an outer perimeter wall or dimples or projections in the domed surface, might help in stabilizing foods placed on the dome shaped surface to keep them from sliding off. A raised texture on the upper surface of dome shaped turntable 124 might also help in separating greases and oils away from food being cooked.

Figure 11:
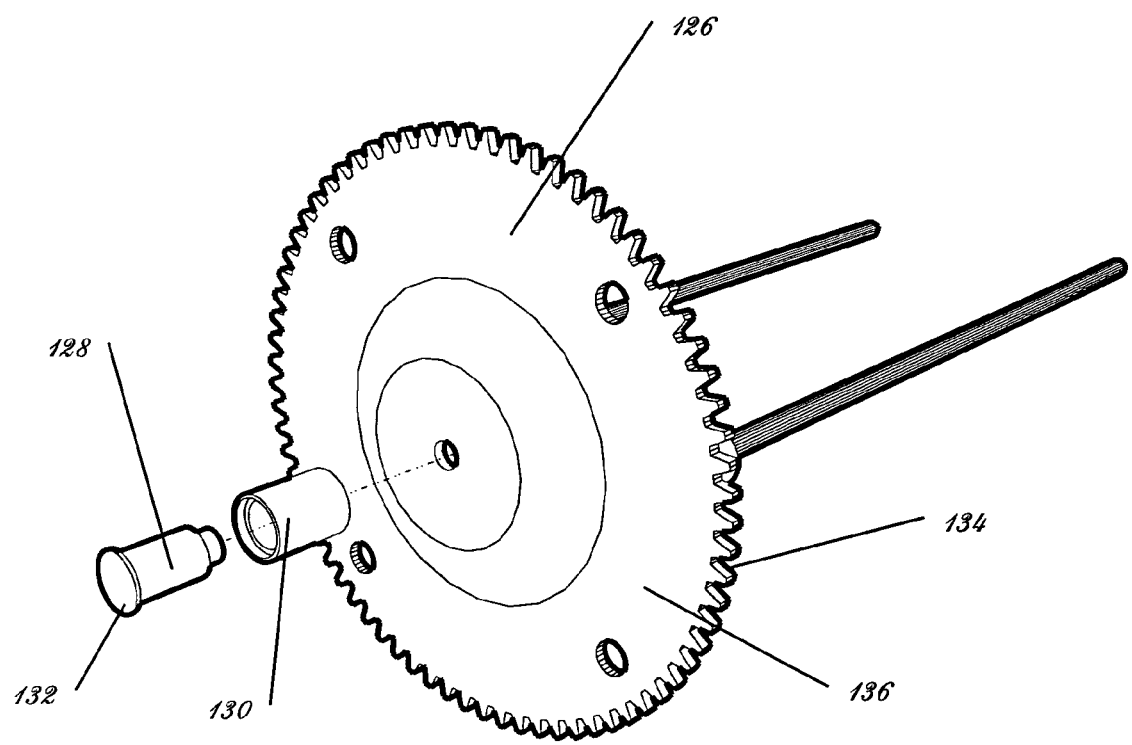
FIG. 11 shows an upper left perspective view of part of spit assembly with the left axle exploded.

Referring to FIGS. 1 and 11, and to U.S. Pat. Nos. 6,142,064 and 6,568,316 and associated patents, spit assembly 20 includes spit plate 126, as well as axle pin 128 which is surrounded by cylindrical sleeve 130. Cylindrical sleeve 130 is self lubricated and rotates independently of axil pin 128. Axil pin 128 is integrally connected to spit plate 126 and captures cylindrical sleeve 130 between spit plate 126 and head 132 of axil pin 128. When food is being cooked, cylindrical sleeve 130 rests into cooking position 90 of spit supports 30. This arrangement helps reduce noises when spit assembly 20 is rotating including: squeaking, rubbing, and other noises.

Depending on specifics, such as ambient temperature, and greases, chemicals, and oils to which it might be exposed, cylindrical sleeve 130 might be fabricated from any of many different materials known in the art. Such materials include by way of example, and not by way of any limitation: Teflon, brass, self lubricated bearing materials, acetyl plastic or other materials known to those with knowledge of the art. As an even more specific example, Teflon provides both high heat resistance as well as resistance to chemicals, greases, and oils. It is also good at absorbing sound generated by movement.

Because it's removable and covers so much interior space, spit plate 126 on spit assembly 20 may be coated on inside surface 134 with a nonstick coating to make cleaning of oven cavity 28 easier. The unusual arrangement of having a large plate at one end of, or large spit plates on both ends of, spit assembly 20 means that it provides a substantial inner liner for oven cavity 28. This inner liner, when coated with a nonstick coating, is easily removable and easy to clean. Outside surface 136 of spit plate 126 may also be coated with an easy to clean surface to facilitate cleanup. As described in earlier U.S. Pat. Nos. 6,142,064 and 6,568,316, spit assembly 20 may have two spit plates. Either or both spit plates on spit assembly 20 may be treated in the manner described above.

Figure 12:
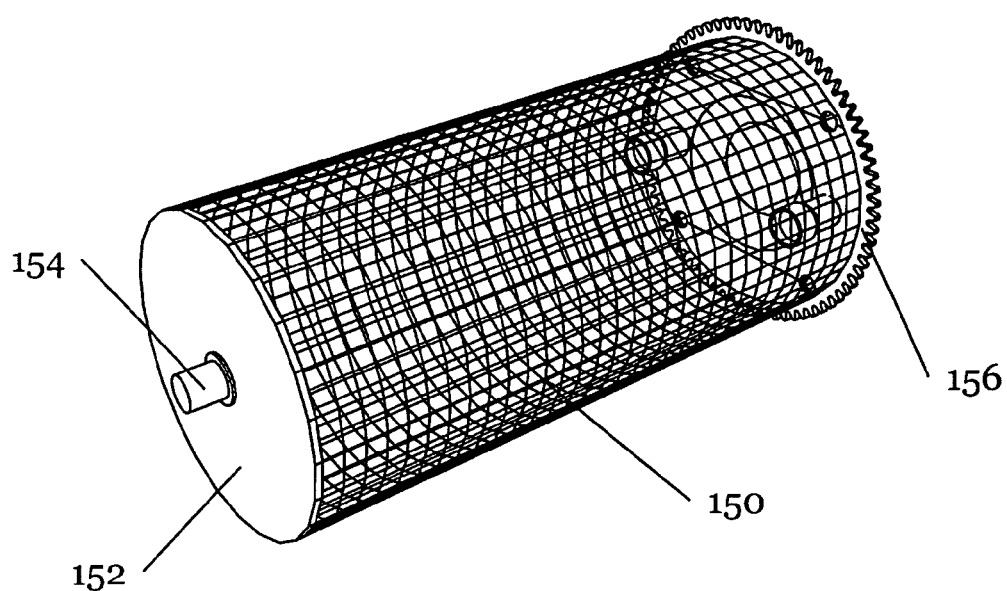
FIG. 12 shows a perspective view of a spit assembly used to cook bread and other farinaceous products.
Figure 13:
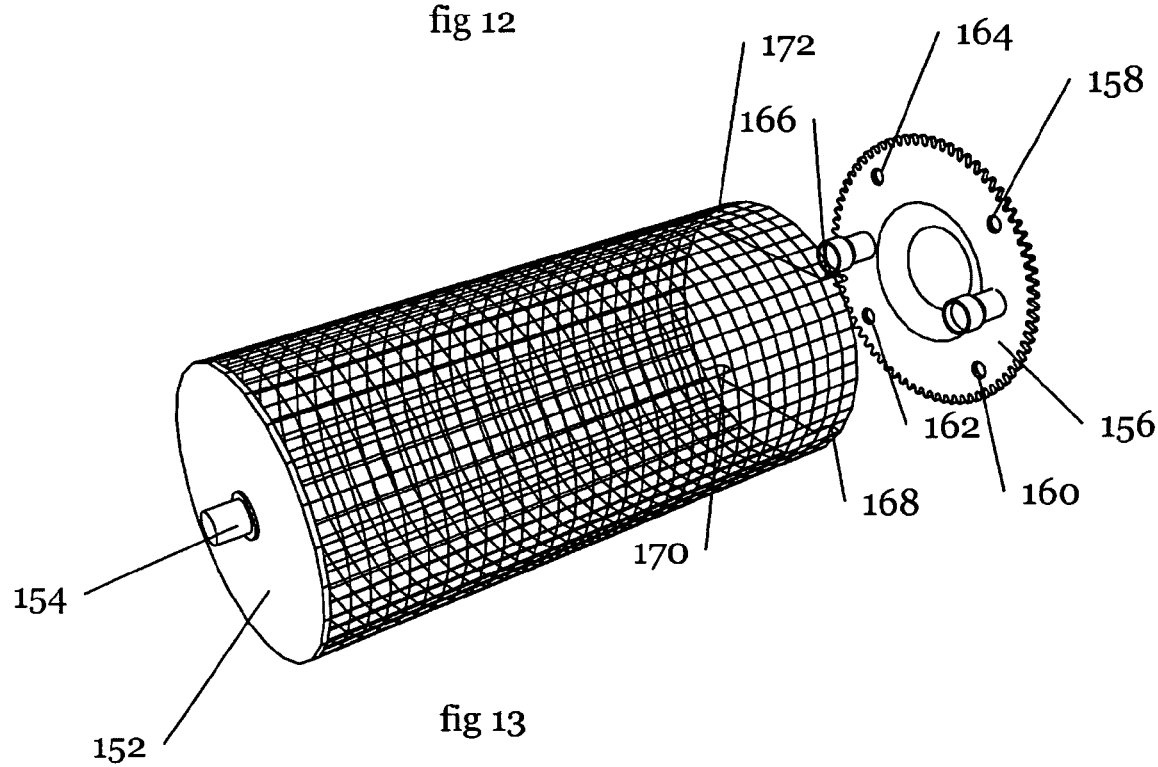
FIG. 13 is a perspective view of the spit assembly shown in FIG. 12 with one end removed.

Referring to FIGS. 12 and 13, a preferred embodiment spit assembly is shown which is used to cook breads and other farinaceous products. Cylindrical wire screen perimeter wall 150 is attached on one end to solid circular wall 152 which has cylindrical spit axil 154 at its center. Capping the other end of cylindrical wall 150 is removable cap 156 which is geared on its outer circular periphery, and which is penetrated on its face by holes 158, 160, 162, and 164. Wire protrusions 166, 168, 170, and 172 which are connected to the open end of cylindrical wall 150 respectively protrude into each of these holes, and help secure and center removable cap 156 to cylindrical wire screen perimeter wall 150. On the center of its face which is opposite cylindrical perimeter wall 150, removable cap 156 has a second cylindrical spit axil which is not shown in the figures.

The preferred embodiment shown in FIGS. 12 and 13 may be constructed of any of a variety of materials known to those knowledgeable in the art. As an example, and not by way of any limitation, perimeter wall 150 might be constructed of aluminum screen of a window screen size match, with solid circular wall 152 constructed of stamped, 0.06 in. aluminum. Removable cap 156 might be constructed of steel, and coated with either chromium or a nonstick surface such as Teflon.

Wire protrusions 166, 168, 170, and 172, might be constructed of 0.1 in. chromium plated steel wire. Cylindrical axil 154 might be constructed of chromium or Teflon coated steel.

In operation, a user would remove cap 156 from perimeter wall 150 and insert an uncooked bread loaf. Cap 156 would then be replaced over the open end of perimeter wall 150, and the entire assembly would then be placed in a rotisserie oven similar to that described earlier in this document. After cooking, the entire preferred embodiment would then be removed from the rotisserie oven, and removable cap 156 taken off to allow the then cooked bread loaf to be removed for serving.

The preferred embodiment shown in FIGS. 12 and 13 has at least the advantage that cooking is done evenly on all sides of the bread. Variants of the embodiment also appeared to cook breads significantly faster than use of a conventional oven.

Figure 14:
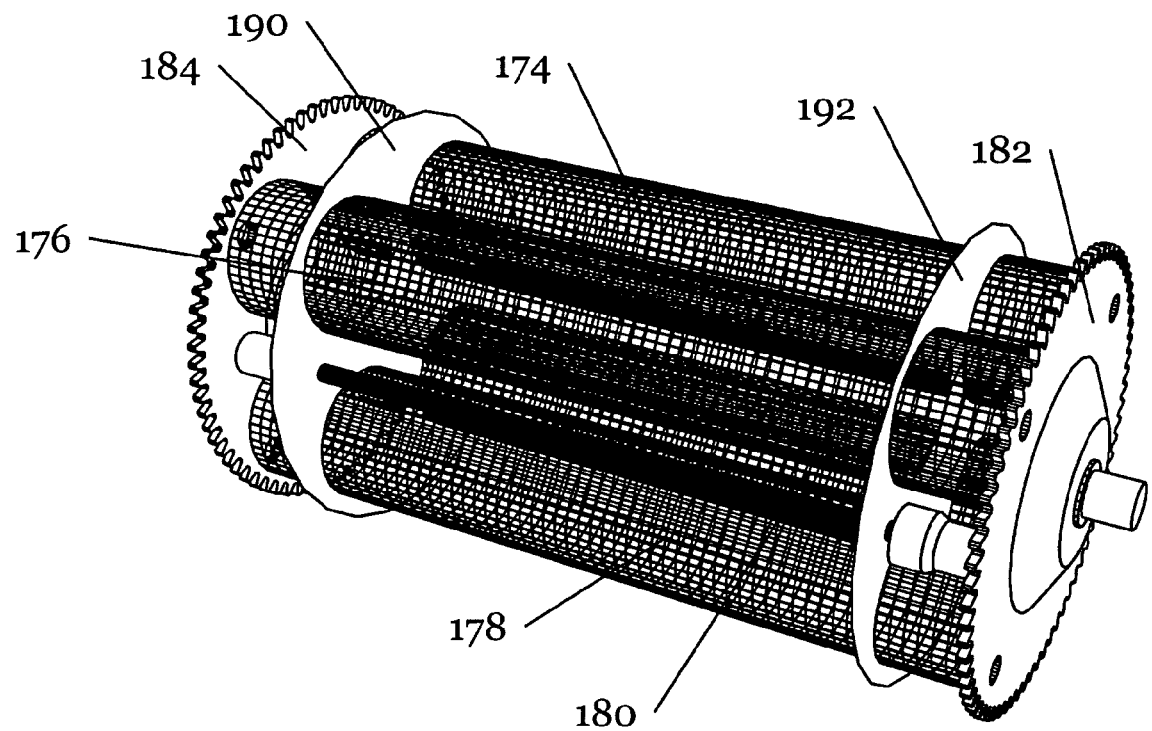
FIG. 14 is a perspective view of a spit assembly used to cook multiple breads and other farinaceous products simultaneously.
Figure 15:
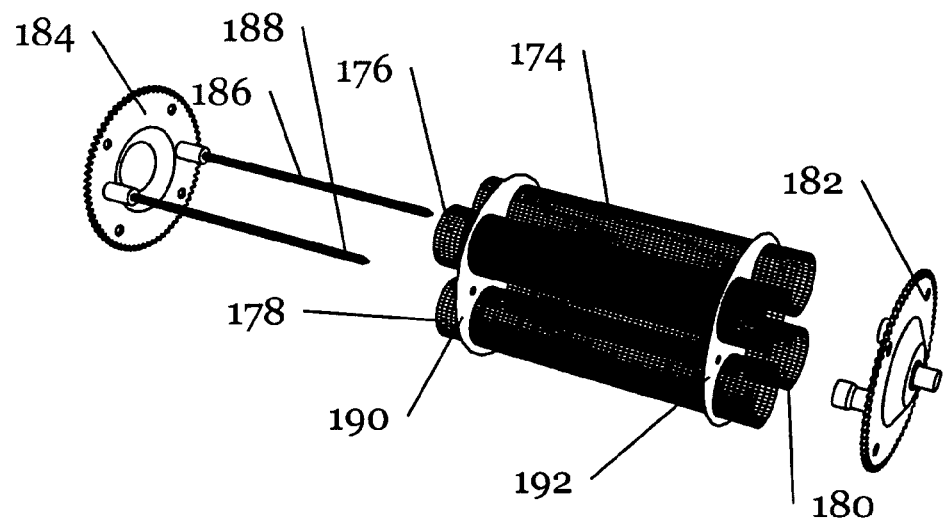
FIG. 15 is a perspective view of the spit assembly shown in FIG. 14, but with both end portions removed.

FIGS. 14 and 15 show a preferred embodiment to cook breadsticks. Perforated cylindrical walls 174, 176, 178, and 180 are lodged between spit plates 182 and 184 which cap each of the cylindrical walls' respective ends. Spit rods 186 and 188 suspend and support cylindrical walls 174, 176, 178, and 180 between spit plates 182 and 184 by means of penetrating intermediate support plates 190 and 192 as shown in FIGS. 14 and 15.

In use, spit plate 182 is removed, thus opening the ends of cylindrical walls 174, 176, 178, and 180. An uncooked breadstick is then placed inside at least one of the cylindrical walls. Spit plate 182 is then replaced and the entire assembly placed into a rotisserie oven such as described earlier in this document. Here it is cooked. After cooking, the entire assembly is removed from the oven and spit plate 182 removed so that the cooked breadsticks can be removed for serving.

This preferred embodiment may be constructed using materials and techniques described for the previous preferred embodiment.

Besides being able to be used to cook breads as described, both of the above described embodiments may be used for other purposes. As examples, and not by way of any limitations, they may be used to: cook rolls and other shapes of bread, roast coffee beans, pop popcorn, roast nuts, or roast or cook other food articles.

What has been described herein are specific preferred embodiments of the present inventions. Many changes and variations will be easily derived from the descriptions contained herein by those knowledgeable in the art. As examples, and not by any way of limitation: embodiments might be constructed at any desirable scale; embodiments might be freestanding, without need of a countertop to support them; embodiments might have oven cavities of different shapes such as a cylinder on its side or a vertical cylinder; control boxes might be located on the top, bottom, or front of the embodiment; horizontal and/or vertical spits might utilize only a single rod, or might have more than two rods; the spit drive might utilize a socket coupled to the end of the spit rod to rotationally power the spit assembly; heating elements other than the rod type electric one shown might be utilized including gas or liquid powered elements or less conventional electric heating elements such as quartz or solid-state elements; or embodiments might be built into household ovens.

Such variations and many others would be readily apparent to one knowledgeable in the art and hence should be considered as obvious from the descriptions contained herein.

What is claimed is:

1. A cooking system comprising:
   housing means defining an interior chamber, the housing means including an opening adapted to receive a food product into the interior chamber;
   door means adapted to selectively seal the opening;
   the housing means further defining a port adapted to matingly receive a removable heating element therethrough; and
   a control box including,
      a control box housing,
      an elongated, electrical resistance heating element secured to the control box housing so as to extend outwardly from an exterior therof,
      means adapted to selectively secure the control box housing to an exterior of the housing means such that the heating element is received through the port so as to extend into the interior chamber relatively proximate to a selected interior portion of the housing means,
      a motor,
      a mechanical coupling operatively engaged to the motor, which mechanical coupling is positioned so as to be adapted to provide a mechanical link therewith to an associated object disposed in the interior chamber, and
      means adapted to selectively receive electrical energy into the at least one of the heating element and the motor.

2. The cooking system of claim 1 further comprising:
   means for securing, within the interior chamber, at least one rotatable member to the mechanical coupling so as to be linked therewith such that mechanical energy from the motor is transferred to the rotatable member through the mechanical coupling.

3. The cooking system of claim 2 wherein the rotatable member is at least one of a rotisserie and a turntable for moving food associated therewith relative to the electrical resistance element when disposed in the interior chamber.

4. The cooking system of claim 3 wherein the housing includes means adapted for receiving a drip pan therein, which drip pan is oriented so as to receive drippings from food disposed in the interior chamber while being heated by the heating element.

5. The cooking system of claim 3 wherein the control box includes a settable timer adapted for selectively activating at least one of the rotatable member and the heating element for a selected duration.

6. The cooking system of claim 3 wherein the control box includes a settable timer adapted for selectively activating at least one of the rotatable member and the heating element for a selected duration.

7. The cooking system of claim 3 wherein the control box includes a lighting element adapted to project light into the interior chamber when the control box is secured to the exterior of the housing.

* * * * *